(12) United States Patent
Sah et al.

(10) Patent No.: US 8,578,363 B2
(45) Date of Patent: Nov. 5, 2013

(54) DIFFERENTIATED INSTALLABLE PACKAGES

(75) Inventors: Maneesh Sah, Bothell, WA (US); Garett Richard Nell, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1557 days.

(21) Appl. No.: 11/470,281

(22) Filed: Sep. 6, 2006

(65) Prior Publication Data

US 2007/0261047 A1 Nov. 8, 2007

Related U.S. Application Data

(60) Provisional application No. 60/797,557, filed on May 3, 2006.

(51) Int. Cl.
*G06F 9/44* (2006.01)

(52) U.S. Cl.
USPC .......................................................... 717/169

(58) Field of Classification Search
None
See application file for complete search history.

(56) References Cited

U.S. PATENT DOCUMENTS

| | | | | |
|---|---|---|---|---|
| 5,790,856 A * | 8/1998 | Lillich | | 717/163 |
| 5,832,275 A * | 11/1998 | Olds | | 717/173 |
| 5,881,236 A * | 3/1999 | Dickey | | 709/221 |
| 5,905,797 A * | 5/1999 | McRae | | 705/57 |
| 5,953,533 A * | 9/1999 | Fink et al. | | 717/175 |
| 6,167,567 A * | 12/2000 | Chiles et al. | | 717/173 |
| 6,202,207 B1 * | 3/2001 | Donohue | | 717/173 |
| 6,256,773 B1 * | 7/2001 | Bowman-Amuah | | 717/121 |
| 6,314,565 B1 * | 11/2001 | Kenner et al. | | 717/171 |
| 6,341,373 B1 * | 1/2002 | Shaw | | 717/173 |
| 6,367,075 B1 * | 4/2002 | Kruger et al. | | 717/169 |
| 6,389,589 B1 * | 5/2002 | Mishra et al. | | 717/170 |
| 6,425,126 B1 * | 7/2002 | Branson et al. | | 717/168 |
| 6,493,871 B1 * | 12/2002 | McGuire et al. | | 717/173 |
| 6,510,513 B1 * | 1/2003 | Danieli | | 713/156 |
| 6,968,550 B2 * | 11/2005 | Branson et al. | | 717/168 |
| 7,130,897 B2 * | 10/2006 | Dervin et al. | | 709/221 |
| 2002/0026634 A1 * | 2/2002 | Shaw | | 717/173 |
| 2002/0100036 A1 * | 7/2002 | Moshir et al. | | 717/173 |
| 2002/0174422 A1 * | 11/2002 | Kelley et al. | | 717/178 |
| 2002/0194584 A1 * | 12/2002 | Suorsa et al. | | 717/176 |
| 2003/0028867 A1 * | 2/2003 | Kryloff et al. | | 717/171 |
| 2003/0088516 A1 * | 5/2003 | Remer et al. | | 705/59 |
| 2003/0121033 A1 * | 6/2003 | Peev et al. | | 717/175 |
| 2004/0003266 A1 * | 1/2004 | Moshir et al. | | 713/191 |
| 2004/0015950 A1 * | 1/2004 | Dutta et al. | | 717/171 |
| 2004/0015956 A1 * | 1/2004 | Barfield et al. | | 717/174 |
| 2004/0045000 A1 * | 3/2004 | Hara | | 717/178 |
| 2004/0098715 A1 * | 5/2004 | Aghera et al. | | 717/173 |
| 2004/0103411 A1 * | 5/2004 | Thayer | | 717/171 |
| 2004/0109187 A1 * | 6/2004 | Matsushima | | 358/1.13 |
| 2004/0117784 A1 * | 6/2004 | Endoh | | 717/169 |
| 2004/0187103 A1 * | 9/2004 | Wickham et al. | | 717/168 |
| 2005/0132359 A1 * | 6/2005 | McGuire et al. | | 717/175 |
| 2005/0210448 A1 * | 9/2005 | Kipman et al. | | 717/120 |
| 2006/0075401 A1 * | 4/2006 | Smegner | | 717/174 |
| 2006/0101457 A1 * | 5/2006 | Zweifel et al. | | 717/174 |
| 2006/0117184 A1 * | 6/2006 | Bleckmann et al. | | 713/176 |
| 2006/0184926 A1 * | 8/2006 | Or et al. | | 717/168 |

* cited by examiner

*Primary Examiner* — Jason Mitchell
(74) *Attorney, Agent, or Firm* — Tracy Powell; Powell IP Law, PLLC (57) ABSTRACT

A code fix is communicated using an automatically executable code patch that has an additional code element that allows the code to perform the functions of registration, detection, setup, reporting, tracking, policy verification or clean up.

20 Claims, 4 Drawing Sheets

DIFFERENTIATED INSTALLABLE PACKAGES

This is a non-provisional of U.S. Provisional Application Ser. No. 60/797,557, filed May 3, 2006, the entire disclosure of which is incorporated herein by reference.

BACKGROUND

Customer satisfaction is critically important to a software company's success. Often, patches are deployed to correct problems with software. In some cases, the patches are sent to just a few parties to test the patches but these patches would not be automatically installed and the deployment of these fixes required tedious, manual work from customers contributing to dissatisfaction. For example, in the past, a customer would call product support reporting an issue and request a fix for the issue. Product support would work with a developer to get a private fix created. For the developer, making the private fix required making a source code change in the source tree, compiling the source into binaries, and putting those raw binaries on a share for the product support engineer to share with the customer. The customer would then follow hand-prepared instructions from product support to put the fix onto their affected machines. The new binaries would be manually copied to the location specified by the software manufacturer. The machines would then be rebooted to start running with the fixes. Next, the customer would confirm these fixes work on the machine, and would be asked to clean up these old binaries by rebooting again in safe mode and restoring the original files, then doing a final reboot to start up normally again. The customer would then communicate the results of their test to the software manufacturer.

The process above has many pain points including:
- Developer pain delivering multiple binaries in their fix;
- Customer pain from extra reboots during deployment;
- Customer pain deploying multiple files to single machine;
- Customer pain deploying a fix to multiple machines;
- Customer pain manually removing files after testing;
- Customer pain manually confirming fixes removed after testing;
- Customer pain from downtime due to length of process;
- Product Support pain communicating what/how to deploy; and
- Customer & Product Support pain identifying machines with private fixes.

SUMMARY

Issuing private fixes to software problems has been difficult as the code fixes often involve distributing binary files that customers have to install manually. One approach is to communicate the code fix using an automatically executable code patch that has an additional code element that allows the code to perform the functions of registration, detection, setup, reporting, tracking, policy verification or clean up. The automatic code fix has a level of trust that is less than a traditional code fix but sufficient to make the necessary code changes and the code fix to the software is visually noted on the display.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
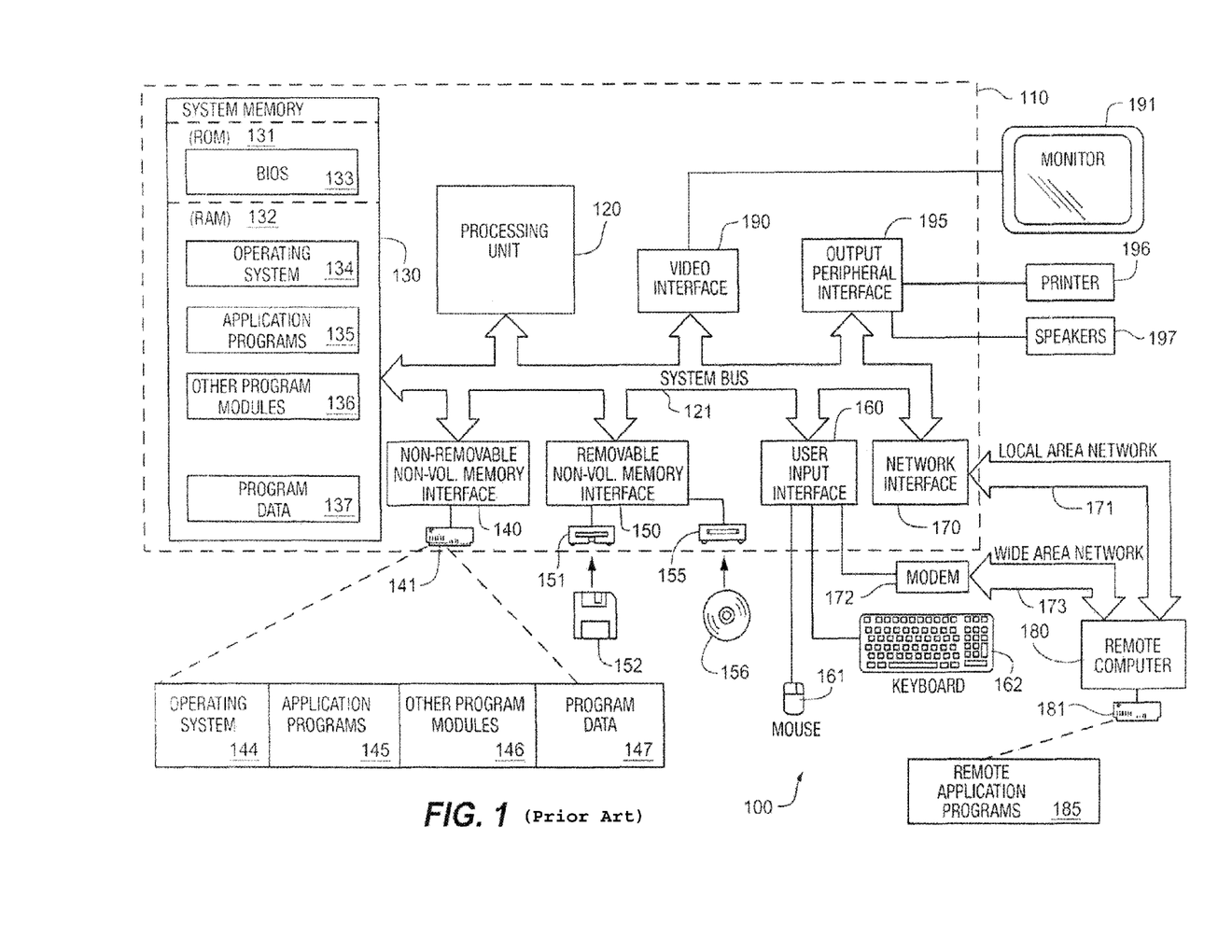
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and the Peripheral Component Interconnect-Express (PCI-E).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 program data 137, and batch module 138.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 program data 147, and batch module 148. Note that these components can either be the same as or different from operating system 134, application programs 135, other program modules 136 program data 137, and patch module 138. Operating system 144, application programs 145, other program modules 146 program data 147, and patch module 148 are given different numbers here to illustrate that, at a minimum, they are different copies. The patch module 148 fixes a software application. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
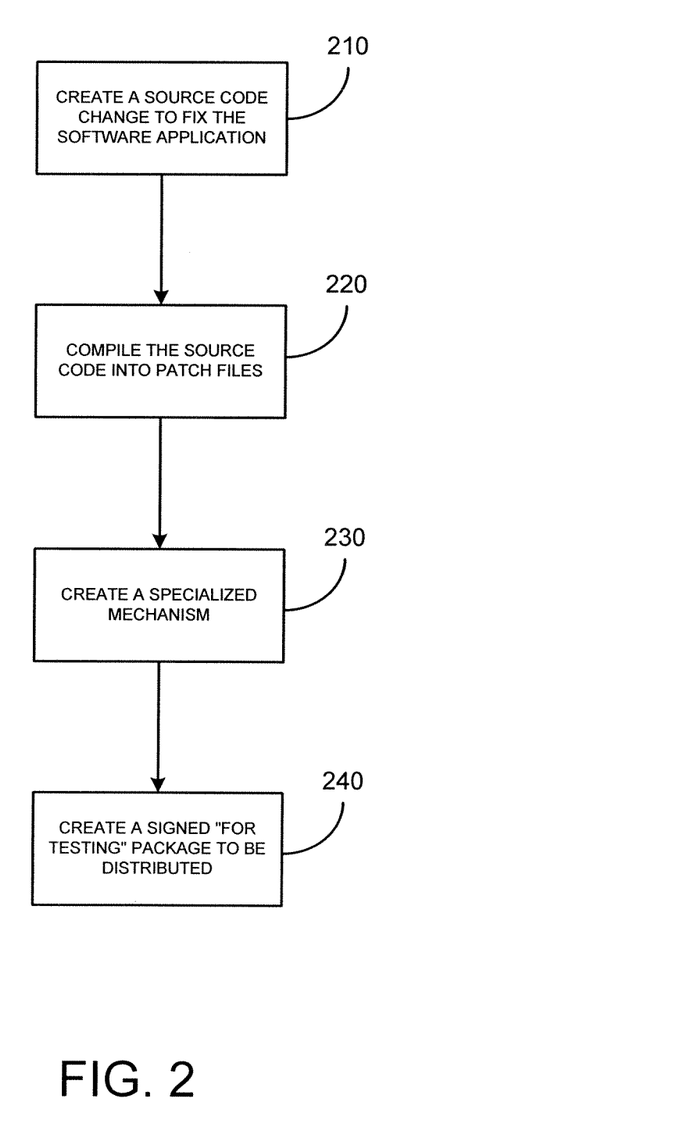
FIG. 2 is a block diagram of a method of distributing fixes to a software application.

FIG. 2 may be a graphical illustration of a method of distributing fixes to a software application that may be performed by the computer 110 described in FIG. 1. At block 210, the method may create a source code change to fix the software application. Software is complicated and often times, software may be distributed that has a problem that is not immediately apparent. After a period of time, a user may notice a problem with some software. The user may report this problem to the software manufacture who may try to fix the problem. Ideally, the patch works and does not create any other unexpected problems. But just like any software, problems based on the patch may not appear for a period of time. Accordingly, patches may not be widely distributed but may be distributed to select parties (such as the party that noticed the problem) for testing before the patch is widely distributed in order to avoid creating additional problems.

At block 220, the source code of the patch may be compiled into a file to be communicated. In one embodiment, the patch file may be compiled into a binary file. Of course, the source code may be converted into any useful format and distributed accordingly. The file may be communicated to a single end user, multiple end users or to a network of end users.

At block 230, the method may create a specialized mechanism that includes additional executable code that is not a component of an installer or the binary payload containing the source code fix. The specialized mechanism may be adapted to perform a variety of functions such as registration, detection, setup, reporting, tracking, policy verification or clean up. Detection may review the computer 110 on which it is to be installed, determine whether changes need to be made to the computer 110 such that the installer will operate properly or ask the computer 110 for permission to run the installer. Setup may assist in setting up the computer 110 or with installing the patch. Reporting may report data back to a remote system or computer 110, the patch creator, or local user. The data may include information on the patch installation, state change (such as a reinstallation), or uninstallation and whether the patch was a success or a failure. Tracking may report back tracking data on the size of the patch, the content of the patch, the patch deployment time, subcomponents of the patch deployment time, whether a system restart was required, the user credential used when the patch was installed, a change in the number of software applications or services on the computer 110 (some patches carry new applications not previously present on the machine possibly in addition to fixes for existing components), system hardware or capabilities now able to be detected after patch payload deployed, other changes in system condition (such as a decrease in disk fragmentation, for example), the number of patch installations, any problems with the patches, etc. Policy verification may ensure that the patch conforms to system or administrative policies such as the patch is digitally signed and not a malicious patch, or the system is permitted to install a patch, or the user is not authenticated to deploy patches or this particular patch, etc. Clean up may assist with returning the computer 110 to a functional state. The specialized mechanism will be further discussed with respect to FIG. 3.

At block 240, the method may create a signed "for testing" package to be distributed. The package may include executable installer code that is automatically deployed when the entire package is received, the patch files and the specialized mechanism from block 230.

Figure 3:
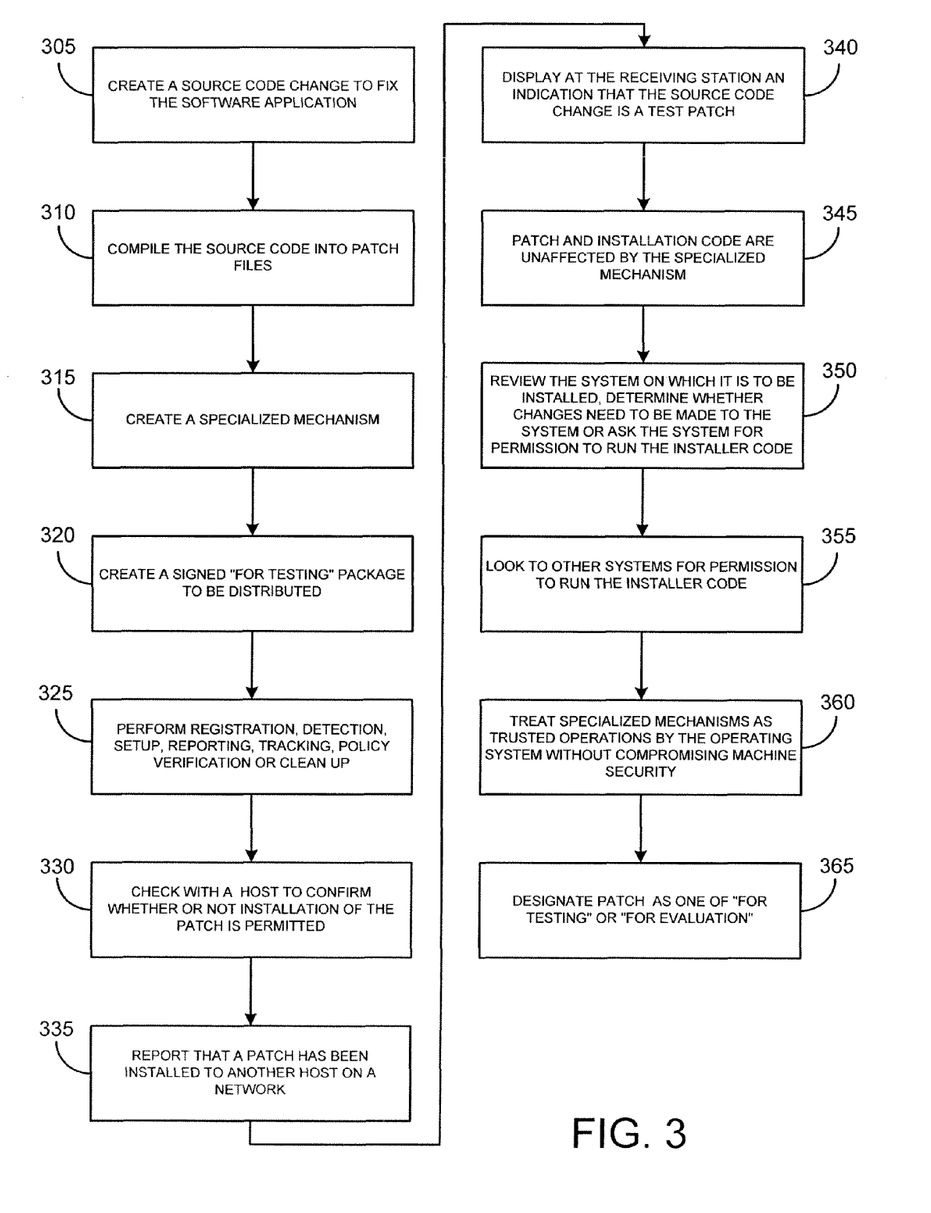
FIG. 3 is a block diagram of an additional method of distributing fixes to a software application.

FIG. 3 may be a more detailed embodiment of the method. Blocks 305-320 may be the same as previously described blocks 210-240 in FIG. 2. At block 325, the specialized mechanism may check with a host to confirm whether or not installation of the patch is permitted. For example, in order to modify files in software, some level of trust must be present to avoid having malicious code be installed in software. That level of trust may be obtained through a variety of ways. In one embodiment, a signed certificate is used that is verified by a third party and is recognized by the user's computer 110 as being trusted. In another embodiment, the user's computer 110 may not recognize that the certificate is to be trusted, but the user may be part of a network and an authority or other host on the network may recognize that the certificate should be trusted.

At block 335, the specialized mechanism may report that a patch has been installed to another host on a network. If the patch has been installed to another host on the network then it may not be necessary to install the patch on the computer 110 in question. On the other hand, the host may decide that the code should be the same on all computers 110 on the network and it may become necessary to install the patch such that the code on the computer 110 in question is the same as all the computers 110 on the network.

At block 340, the method may display at the receiving station an indication that the source code change is a test patch. There may be variety of levels of patches or fixes that are distributed. Test patches may be patches that are thought to address a problem but have not been fully tested and evaluated. Accordingly, it may not be appropriate to widely distribute test patches and it makes logical sense to indicate on the display 191 of the computer 110 in question that a test patch has been installed. The indication may be a watermark, may be a text box, or may be a window, all of which indicate that a test patch is present on the computer 110 in question. The watermark may be visible to other network users that access the computer 110 with the test patch. Additionally, the presence of a 'for testing' patch can be communicated to the user via an audible alert to the speakers 197 or via an LED or other light on the keyboard 162 or mouse 161 when associated with the computer 110.

At block 345, the method may allow for the specialized mechanism to be added to patches without affecting the underlying patch or installation code. Related, at block 345, the specialized mechanism may be added to a pre-existing patch whereby the patch and installation code are unaffected by the specialized mechanism.

At block 350, in one embodiment, code may have already been distributed to computers 110 such that the specialized mechanism will be recognized and handled appropriately. For example, the specialized mechanism may review the computer 110 on which it is to be installed, and determine whether changes need to be made to the computer 110 such that the installer will operate properly or asking the computer 110 for permission to run the installer code. At block 355, in another embodiment, the specialized code will be activated as part of the trusted installation code and if the specialized code is not recognized by the computer 110, the specialized code may instruct the computer 110 to seek out the necessary support to allow the specialized code to operate as intended. The necessary support may be obtained from the software manufacture, from another computer 110 on a network, from a host computer 110 or from another source.

At block 360, the method may treat the specialized mechanism as trusted operations without compromising machine security. Depending on the patch to be distributed, a certain level of trust is necessary to modify files. For example, if the files in question are core system files, a high level of permission is required. If the files are non-core system files, a lesser level of trust may be necessary. As such, the level of trust distributed with the patch may be related to the patch itself. Whatever level of trust is used, it may be appropriate in view of the patch to be distributed and may not jeopardize the security of the computer 110. For example, at block 365, a patch may be designated as one of "for testing" or "for evaluation" and the level of trust is different for patches designated "for testing" and patches designated "for evaluation." Further, the level of trust may be different than official final patches.

Figure 4:
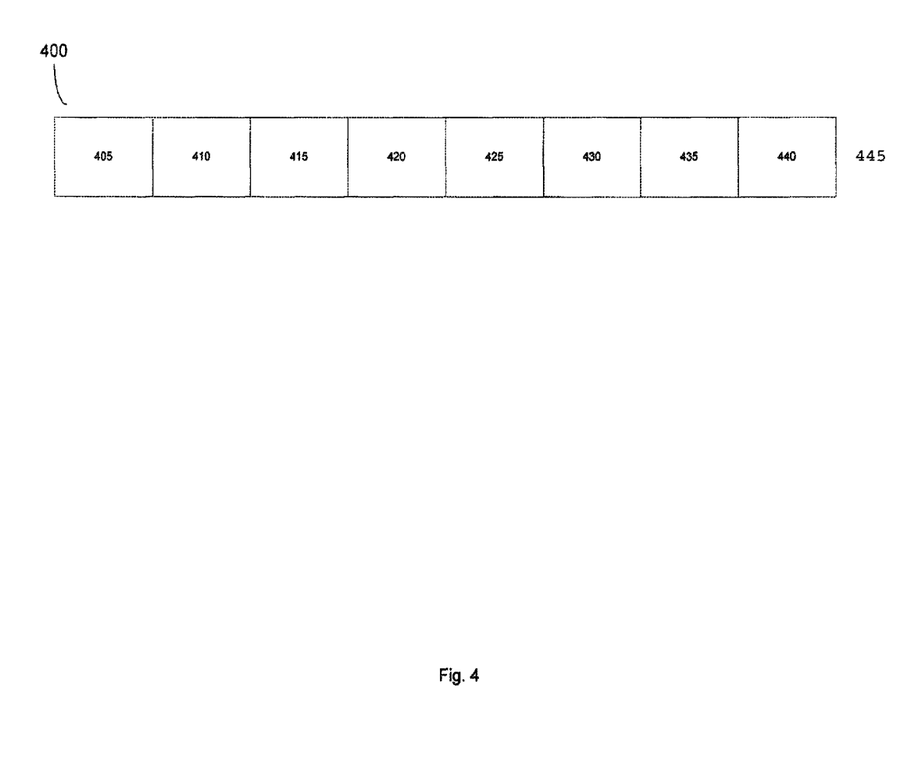
FIG. 4 is a graphical illustration of a file in accordance with the claims.

FIG. 4 may illustrate a sample self extracting executable file 400 for providing a fix to a computer application. The file 400 may include a package installer module 405 which may automatically install the patch when it is activated. The file 400 may also have a wrapper 410 to the package installer 405 which may allow for the package installer 405 to be easily communicated. The wrapper 410 may be an executable file named clearly to differentiate the deliverable as a private patch rather than a traditional, broadly distributed patch (or hotfix). The executable name may include the phrase '-fortestingpurposesonly' (For Testing Purposes Only). The name may also allow the file to be located by the detection algorithm. The wrapper 410 may be the enabling technology to support "specialized mechanisms" as described in FIGS. 2 and 3. The specialized mechanism in this embodiment may be a certificate management utility. The wrapper 410 may call into the certificate management utility before calling the package installation component. It may detect any error conditions thrown by the utility and report them back to the user.

The file 400 may also use a certificate management utility 415 which may be similar to the specialized mechanism described in FIGS. 2 and 3. The specialized mechanism in a patch 'for testing' may be the certificate management utility 415. It may perform the detection, registration, setup, and clean-up functionality described above that a specialized mechanism could perform.

In one embodiment, the certificate management utility 415 performs the following tasks during installation:

>  Detects the certificate that trust the patch content
>  If the certificate is found,
>      It scans the user computer 110 for other 'for testing' patches
>      If none are found,
>          It sets a "do not remove" key
>      Otherwise,
>          It installs the needed certificate Upon completion, the utility returns to the wrapper 410, which checks for errors before calling the package installer. The package installer continues from there. Any return code is passed back through the wrapper 410 and returned to the user.

The certificate management utility 415 performs the following tasks after uninstallation:

>  Detects the "do not remove" key
>  If "do not remove" bit is found,
>      It returns, leaving the certificate
>  Otherwise,
>      It scans the computer 110 for private patches
>      If none are found,
>          It removes the certificate
>      Otherwise,
>          It returns, leaving the certificate "After uninstallation" refers to a window of time after the uninstaller components have completed, but before indicating completion to the user. It is during this time the utility is called with an argument to indicate uninstallation mode. Uninstallation may seamlessly return the customer's machine to one not containing the certificate of 'for testing' packages. Of note, the complete return to a normal state will only occur when no more registered content depending on the certificate exists. Also, the removal of the certificate leaves behind the visual cue until the next reboot though other computers 110 could remove the cue immediately.

The file 400 may also contain a detection algorithm 420 for finding patch content with the appropriate title (for testing). For example, the patch may check to see if the patch has already been installed or if the proper code is already on the computer 110 such that the certificate management utility 415 may operate properly.

The file 400 may contain a signing mechanism 425 that can assign authority different from official patches. For example, a patch may arrive with a generic level of security that may be unnecessarily high to install the code in the patch. The signing mechanism 425 may act as a second level of authority checking and may adjust the level of authority as appropriate or indicated by the patch itself. For example, official hotfix packages from Microsoft are digitally signed using the Microsoft Publisher certificate. 'For testing' hotfix packages are digitally signed using a different Microsoft certificate. The method does not require the use of this particular certificate. The use of this signing mechanism 425 offers several benefits:

1) It is a protection mechanism to prevent a miscreant from distributing the private fix as an official hotfix package; and 2) It facilitates creation of private hotfix packages on developer machines.

In the implementation, the package payload may be trusted by a catalog that is test signed with a Microsoft 'test' certificate. Code on a particular system may exist to recognize certain certificates to trigger a watermark on the bottom-right corner of their screen, indicating the presence of unofficial content on the computer 110. A hotfix package creation process then supports creating packages containing all differentiating features including the specialized mechanism to have the package register and work 'for testing'. The process runs on an individual developer's machine with minimal setup and minimal time investment to create such a hotfix package.

The file 400 may contain a "do not remove" key 430. When a first test patch is installed, a key may be set to allow additional test patch data to be installed. In some circumstances, a second test patch may also be installed. However, if the first test patch is removed, the permission to receive addition patch data may also be removed. By setting the do not remove key, the permission to implement and receive data about the second patch may be maintained.

The file 400 may contain a mechanism for enforcing a limited installation window 435. A limited installation window may be enforced in the 'for testing' package to help prevent customers from installing an out-dated patch. A timestamp of a future date (the expiration date) may be registered in the package and during installation, the current date is compared with this timestamp. If the current date is beyond the date of expiration, installation is blocked and the user is presented with a message. In the implementation, the code for the check may be in an external library that is activated by the installer.

The file 400 may contain a name to differentiate the package from other fixes and indicate a level of trust 440. The wrapper may be an executable file named clearly to differentiate the deliverable as a private patch rather than a traditional, broadly distributed patch (or hotfix). The executable name may include the phrase '-fortestingpurposesonly' (For Testing Purposes Only).

The file 400 may contain a specialized package 445 that performs at least one function such as registration, detection, setup, reporting, tracking, policy verification or clean up. Detection may review the computer 110 on which it is to be installed, determines whether changes need to be made to the computer 110 such that the installer will operate properly or asks the computer 110 for permission to run the installer. In one embodiment, the detection algorithm for this implementation may operate as follows:

Iterates over the hotfix key HKEY_LOCAL_MACHINE\SOFTWARE\Microsoft\WindowsNT\CurrentVersion\Hotfix looking for a distinct mark made by an installed private package:

Returns true if 1 or more privates are found, false otherwise.

This form of registration allows for administrative tools to scan computers 110 for fixes of the class 'for testing' with only remote registry access.

As previously disclosed, setup may assist in setting up the installer and in installing the patch. Reporting may report back to the patch creator upon installation and on patch success or failure. Tracking may report back tracking data on the number of patch installations, any problems with the patches, etc. The policy verification may ensure that the patch is a properly signed patch and not a malicious patch. Clean up may assist with returning the computer 110 to a functional state. If the patch does not solve the problem or creates new problems, the patch may be removed and the computer 110 may return to its pre-patch state.

As a result of the method, several opportunities may now be available. Installing automatic patches is easier than installing binary files. One patch package may contain one or more patch files. Installing and uninstalling the patch is now as easy as with official patches and users experience a more consistent servicing experience. Special-case deployment instructions are not needed. Fewer reboots are required and less training is required for customer technicians. Detecting private fixes is now easy with differentiated naming and specialized registration. The whole end-to-end process takes less time.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method of distributing fixes to a software application problem comprising:
   creating a source code change to fix the software application problem;
   compiling the source code change into a patch file to be communicated, the patch file including a certificate indicating a level of trust to be assigned to the patch file;
   creating executable installer code for installing the patch file;
   creating a specialized mechanism that includes additional executable code comprising:
      a certificate management utility configured to install a "for testing" certificate and set a "do not remove" key if a "for testing" certificate is not found on a receiving computer; and
      a signing component for adjusting a level of security granted to the installer code according to the patch file's certificate; and;
   creating a signed "for testing" package to be distributed, the "for testing" designation being indicative of a test package, where the test package comprises:
      the executable installer code;
      the patch file; and
      the specialized mechanism;
   wherein the signed "for testing" package, upon installation, causes an indication to be displayed that the test package was installed; and
   wherein the certificate management utility, upon installation, tests the patch file's certificate and causes the signing component to adjust the level of security granted to the executable installer code.

2. The method according to claim 1, wherein the specialized mechanism performs at least one selected from a group comprising:
   registering the patch file;
   detecting whether a receiving computer can accept the test package by:
      reviewing the receiving computer on which it is to be installed,
      determining whether changes need to be made to the receiving computer such that the executable installer code will operate properly or
      asking the receiving computer for permission to run the executable installer code;
   setting up by assisting in setting up the receiving computer or with installing the patch file;
   reporting by communicating reports back to one selected from a group comprising:
      a remote computer,
      the patch creator, or
      a local user on the receiving computer;
   data about one selected from a group comprising:
      state changes,
      uninstallation requirements, or
      patch installation success or failure;
   tracking by communicating tracking data on at least one of:
      size of the patch file,
      content of the patch file,
      patch file deployment time,
      subcomponents of the patch file deployment time,
      whether a system restart was required,
      user credential used when the patch file was installed,
      a change in a number of software applications or services on the receiving computer, system hardware or capabilities now able to be detected after patch payload deployed,
changes in system condition,
a number of patch file installations, and
any problems with the patch file;
verifying policy by ensuring that the patch file conforms to system or administrative policies, or
cleaning up by assisting with returning the receiving computer to a functional state.

3. The method according to claim 2, wherein the system or administrative policies comprise:
the patch file is digitally signed and not a malicious patch,
the receiving computer is permitted to install the patch file, and
a user is authenticated to deploy patches or this particular patch.

4. The method according to claim 2, further comprising using the specialized mechanism to check with a host to confirm whether or not installation of the patch file is permitted.

5. The method according to claim 2, further comprising using the specialized mechanism to report that the patch file has been installed on another host on a network.

6. The method of claim 1, wherein the indication comprises at least one of:
a visual indication on a display;
an audible alert; and
a visible indication on a keyboard or mouse associated with a computer.

7. The method according to claim 1, whereby the specialized mechanism is added to existing patches.

8. The method according to claim 1, wherein the specialized mechanism is executed by the operating system as a trusted operation.

9. The method according to claim 1, wherein the patch file is associated with a level of trust and wherein a patch file modifying core system files requires a first level of trust and a patch file modifying non-core system files requires a second level of trust.

10. The method of claim 1, further comprising the specialized mechanism looking to other computers for sufficient permission to run the installer.

11. The method of claim 1 wherein the indication that the patch file is installed is visible to a network user remotely.

12. A computer-storage medium storing computer-readable instructions, which when executed by a computer provide a fix to a computer application problem, comprising:
a patch component that corrects the computer application problem when installed;
a package installer component that automatically installs the patch component when the package installer component is activated;
a wrapper component to the package installer component, the wrapper component being indicative of a private patch;
a certificate management utility component, the certificate management utility component detecting a certificate that trusts the patch component during installation and for setting and detecting a "do not remove" bit;
a detection algorithm component for finding the patch component content with appropriate title;
a signing mechanism component adjusting a level of security as indicated by the patch component, the signing mechanism component assigning a first level of security for a private patch component and a second level of security for an official hotfix package;
a mechanism component enforcing a limited installation window; and
a naming component differentiating the patch component from other fixes and indicating a level of trust and a patch file intended to modify core system files requires a first level of trust and a patch file intended to modify non-core system files requires a second level of trust;
wherein, upon installation, the certificate management utility component scans for other patches, if none are found it sets the "do not remove" bit, and otherwise installs the certificate; and
upon uninstallation, the certificate management utility component tests for the "do not remove" bit and if the "do not remove" bit is not found scans the computer for private patches and removes the certificate only if none are found.

13. The computer-storage medium of claim 12, wherein the certificate management utility component performs at least one function selected from a group comprising:
registration of the patch component content;
detection, wherein detection further comprises reviewing a receiving computer on which the patch component is to be installed, determining whether changes need to be made to the receiving computer are such that the package installer component will operate properly or asks the receiving computer for permission to run the package installer component;
setup, wherein setup further comprises assisting in setting up the receiving computer or with installing the patch component content;
reporting, wherein reporting reports back to one selected from a group comprising:
a remote computer,
a patch creator, or
a local user on the receiving computer;
on one selected from a group comprising:
the patch component content installation,
state change required,
uninstallation required or
whether patch content was installed successfully;
tracking, wherein tracking may report back tracking data on at least one of:
the size of the patch component content,
the content of the patch component,
the patch component content deployment time,
subcomponents of the patch component content deployment time,
whether a system restart was required,
a user credential used when the patch component content was installed,
a change in the number of software applications or services on the receiving computer,
changes in system condition,
a number of patch component file installations,
the number of patch component content installations, and
any problems with the patch component content;
policy verification wherein policy verification further comprises ensuring that the patch component content conforms to system or administrative policies, or
clean up, wherein clean up assists with returning the receiving computer to a functional state.

14. The computer-storage medium of claim 13, wherein the system or administrative policies comprise:
the patch component content is digitally signed and not malicious patch content,
the receiving computer is permitted to install a patch, and the user at the receiving computer is not authenticated to deploy patch component content or this particular patch component content.

15. The computer-storage medium of claim 12, wherein the naming component allows the patch file to be located by the detection algorithm component.

16. The computer-storage medium of claim 12, wherein the certificate management utility reports that a patch/fix has been installed on another host on a network.

17. The computer-storage medium of claim 12, wherein the certificate management utility displays at a receiving station an indication that the patch component is a test package.

18. The computer-storage medium of claim 17, wherein the indication comprises at least one of:
   a visual indication on a display;
   an audible alert; and
   a visible indication on a keyboard or mouse associated with the receiving station.

19. A tangible computer storage medium storing computer executable instructions, for distributing fixes to a software application, which when executed perform the steps comprising:
   creating a source code change to fix the software application;
   compiling the source code into a patch file to be communicated, the patch file including a certificate indicating a level of trust to be assigned to the patch file;
   creating executable installer code for installing the patch file;
   creating a specialized mechanism that includes additional executable code comprising:
      a certificate management utility configured to install a "for testing" certificate and set a "do not remove" key if a "for testing" certificate is not found on a receiving computer; and
      a signing component for adjusting a level of security granted to the installer code according to the patch file's certificate; and;
   creating a package to be distributed, the package being designated as "for testing", the "for testing" designation being indicative of a test package, where the package comprises:
      the executable installer code;
      the patch file; and
      the specialized mechanism;
   wherein the signed "for testing" package, upon installation, causes an indication to be displayed that the test package was installed; and
   wherein the certificate management utility, upon installation, tests the patch file's certificate and causes the signing component to adjust the level of security granted to the executable installer code.

20. The computer storage media of claim 19, wherein the specialized mechanism checks if the executable installer code will operate properly when automatically deployed.

\* \* \* \* \*